(12) United States Patent
Doherty

(10) Patent No.: US 11,966,554 B2
(45) Date of Patent: Apr. 23, 2024

(54) USER INTERFACE DEFINED DOCUMENT

(71) Applicant: Field Squared, Inc., Highlands Ranch, CO (US)

(72) Inventor: Jason Doherty, Denver, CO (US)

(73) Assignee: FIELD SQUARED, INC., Highlands Ranch, CO (US)

( * ) Notice: Subject to any disclaimer, the term of this patent is extended or adjusted under 35 U.S.C. 154(b) by 354 days.

(21) Appl. No.: 14/483,151

(22) Filed: Sep. 11, 2014

(65) Prior Publication Data
US 2015/0134707 A1 May 14, 2015

Related U.S. Application Data

(60) Provisional application No. 61/878,234, filed on Sep. 16, 2013.

(51) Int. Cl.
*G06F 3/048* (2013.01)
*G06F 8/34* (2018.01)

(52) U.S. Cl.
CPC ............... *G06F 3/048* (2013.01); *G06F 8/34* (2013.01)

(58) Field of Classification Search
CPC .. G06F 17/30292; G06F 17/3056; G06F 8/35; G06F 9/451; G06F 17/30917; G06F 17/30312; G06F 40/174
See application file for complete search history.

(56) References Cited

U.S. PATENT DOCUMENTS

| | | | | |
|---|---|---|---|---|
| 6,581,062 B1 * | 6/2003 | Draper | .................. | G06F 16/258 |
| 6,590,589 B1 * | 7/2003 | Sluiman | .................... | G06F 8/34 |
| | | | | 715/751 |
| 8,745,096 B1 * | 6/2014 | Noble | .................... | G06F 16/258 |
| | | | | 707/811 |
| 8,819,335 B1 * | 8/2014 | Salessi | ................ | G06F 12/0246 |
| | | | | 711/103 |
| 2002/0133476 A1 * | 9/2002 | Reinhardt | ............. | G06F 16/221 |
| 2002/0169788 A1 * | 11/2002 | Lee | .................... | G06F 17/30595 |
| 2002/0184610 A1 * | 12/2002 | Chong | ...................... | G06F 8/20 |
| | | | | 717/109 |

(Continued)

OTHER PUBLICATIONS

WonderHowTo, How to Share Your Favorite Mobile Apps with Your Friends, Jun. 16, 2011, Business Insider, http://www.businessinsider.com/how-to-share-your-favorite-mobile-apps-with-your-friends-2011-6.*

*Primary Examiner* — Brittany N Allen
*Assistant Examiner* — William P Bartlett
(74) *Attorney, Agent, or Firm* — Schultz & Associates, P.C.

(57) ABSTRACT

The preferred embodiment of the invention encompasses a method used to (a) create computer applications, or (b) create database-backed forms/documents for a customizable user interface within an existing computer program, that (c) can then be stored, queried and analyzed using map-reduce techniques; using nothing but the front-end user-interface design performed on the device and without the use of any computer coding or database management or setup of any kind. The preferred embodiment invention permits both simple documents (also known as forms), documents-within-documents, and business processes that link documents together, to be defined and converted into a working application on a smart phone, tablet or computer system by end users without the use of code or database management by the end user.

7 Claims, 16 Drawing Sheets

(56) References Cited

U.S. PATENT DOCUMENTS

| | | | |
|---|---|---|---|
| 2003/0140308 A1* | 7/2003 | Murthy | G06F 17/30917 715/234 |
| 2005/0066287 A1* | 3/2005 | Tattrie | G06F 9/451 715/769 |
| 2005/0185222 A1* | 8/2005 | Sammis | G06K 15/00 358/2.1 |
| 2006/0225037 A1* | 10/2006 | Glein | G06F 8/38 717/117 |
| 2006/0256937 A1* | 11/2006 | Foreman | G06Q 10/00 379/88.08 |
| 2006/0294117 A1* | 12/2006 | Merchant | G06F 16/313 707/E17.084 |
| 2007/0055936 A1* | 3/2007 | Dhanjal | G06F 9/4443 715/700 |
| 2007/0208665 A1* | 9/2007 | Ohara | G06Q 10/00 705/51 |
| 2008/0114802 A1* | 5/2008 | Gheorghioiu | G06F 17/30917 |
| 2008/0189302 A1* | 8/2008 | Evani | G06F 17/30917 |
| 2008/0313650 A1* | 12/2008 | Arnquist | G06F 9/4443 719/316 |
| 2010/0070515 A1* | 3/2010 | Dutton | G06F 17/30123 707/755 |
| 2010/0318889 A1* | 12/2010 | Billharz | G06F 40/174 715/212 |
| 2011/0060767 A1* | 3/2011 | Agarwal | G06F 17/2247 707/803 |
| 2011/0246535 A1* | 10/2011 | Freeman | G06F 17/30566 707/803 |
| 2011/0289118 A1* | 11/2011 | Chen | G06F 16/86 707/E17.054 |
| 2012/0158794 A1* | 6/2012 | DeBacker | G06F 9/449 707/E17.005 |
| 2012/0254730 A1* | 10/2012 | Sunderland | G06F 40/186 715/234 |
| 2013/0073521 A1* | 3/2013 | Ng | G06F 16/25 707/610 |
| 2014/0059017 A1* | 2/2014 | Chaney | G06F 17/692 707/692 |
| 2014/0280047 A1* | 9/2014 | Shukla | G06F 16/93 707/722 |

\* cited by examiner

| NAME | AGE | CUSTOM1 | CUSTOM2 | CUSTOM3 | CUSTOM4 |
|---|---|---|---|---|---|
| Jason | 40 | 1 | CEO | | No |
| James | 41 | 4 | VP Product Management | | Yes |
| Mark | 37 | 2 | CIO | | Yes |
| Sieg | 41 | 3 | Senior Software Engineer | | Yes |

(Prior Art)

Document Binding = Site Report
REMEDIATION #: "10798"
SITE NAME: "Colorado Shale Assoc Site B"
INSPECTOR LOGS:
  Document Binding = {Inspector Site Log}
    INSPECTOR NAME: "John Spencer"
    BADGE #: "8876"
    RESULT: 2

Document Binding = {Inspector Site Log}
    INSPECTOR NAME: "John Spencer"
    BADGE #: "8876"
    RESULT: 5

FIG. 12

USER INTERFACE DEFINED DOCUMENT

CROSS-REFERENCE TO RELATED APPLICATIONS

This application claims the benefit of U.S. Provisional Application No. 61/878,234, filed Sep. 16, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention relates to data structures and databases.

BACKGROUND OF THE INVENTION

Existing solutions to the problem of repeated database configuration require users to define user interfaces in code using various languages such as C#, C, Objective-C, Java and JavaScript/HTML or in an interface designer using industry standard tools such as Visual Studio, XCode or Eclipse. This is commonly called the View in software engineering. The existing solutions then require the programmer to "bind" or link the controls on the screen to computer code in the background (commonly known as a Controller or a View Model in software engineering). Other code (typically known as the Model in enterprise software engineering terminology) is then written to connect this code to the relational database or other storage mechanism, which uses some kind of schema structure to define how data is stored in the database. The problem with this approach is that computer programming is required at multiple steps to allow a user interface to be connected to a back end database system.

Some solutions to this problem allow users to define the user interface view and controller/view-model code, and then use Object Relational Mapping (ORM) tools (like Hibernate or ORM-Lite) to automatically generate databases that support the code and manage the model and database interactions for you. The limitation with these tools is that each form defined on the screen must have it's own view model/controller defined in code that must be compiled, and the use of the ORM tool results in a database table or schema being defined for each different type of form being created or modeled. This makes a multi-tenant databases for Software as a Service companies, where multiple companies share the same database on a public server, difficult to manage where each company sharing the database has their own custom application with their own custom schemas that map to their own custom forms.

In a traditional relational database 100, as illustrated in FIG. 1, one method used to solve this problem is adding multiple extra columns to each table in the database, which can store end-user-definable information. The user then defines what each CUSTOM column means for the user interface. Then the programmer of a database may define that CUSTOM1 means "Employee Number", CUSTOMER2 means "Job Title" etc. using another table or configuration file in the system. The limitation with this approach is that a user is limited to the number of columns that the database allows per table, and the user can only put simple values into column of each row of the database. Nested documents or documents chained together are not possible.

Another solution to this problem has been the use of a key-value pair table in a relational database or XML database, where a separate table that stores simple key-value pairs can be used to provide extra configurable information for an existing application table. For example, you have an employee table and an additional key-value table 200 that provides extra information for this employee table that doesn't have to be defined at compile-time or database-generation time, as illustrated in FIG. 2.

The limitation of this approach is that the key-value table gets very large (billions of rows) very quickly, making it hard to aggregate and report on the data. More importantly, the key-value table inherently has no structure inherent since it is by definition a simple set of key-value pairs with simple data types since the value column typically only holds string values.

SUMMARY

The preferred embodiment of the invention encompasses a method used to (a) create computer applications, or (b) create database-backed forms/documents for a customizable user interface within an existing computer program, that (c) can then be stored, queried and analyzed using map-reduce techniques; using nothing but the front-end user-interface design performed on the device and without the use of any computer coding or database management or setup of any kind.

The application permits both simple documents (also known as forms), documents-within-documents, and business processes that link documents together, to be defined and converted into a working application on a smart phone, tablet or computer system by end users without the use of code or database management by the end user.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates an example type extended table that has customizable fields.

FIG. 7 illustrates an example of a display of a document generated at runtime from a template.

FIG. 8 illustrates an example of a second part of the document defined by a template in the previous figure, since the sample doesn't fit on a single screen and needs to scroll.

FIG. 12 illustrates an example box diagram showing the concept of a document where one of the elements in the document embeds another sub-document, or in this case, a list of sub-documents.

DETAILED DESCRIPTION

Figure 2:
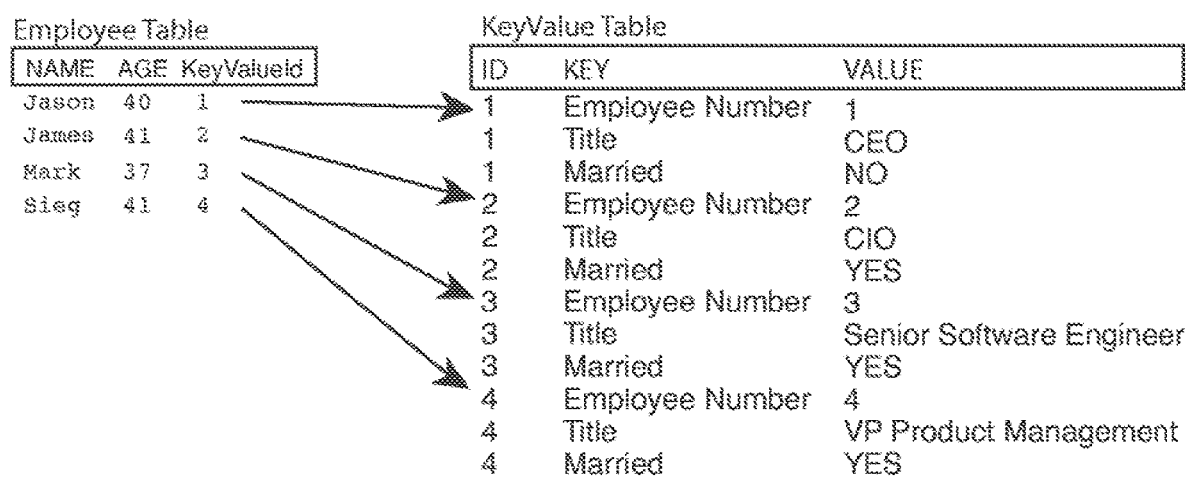
FIG. 2 illustrates an example use of a key-value pair table to extend any table with an arbitrary number of extra pieces of data.

An implementation of the preferred embodiment of the invention disclosed herein provides that one or more documents created on a device are stored as a stand-alone document with its own schema unique to that document at that point in time. Each row in the database effectively has its own schema, and that schema is defined by the user interface that was used at the time to create the document.

This particular solution to the problem of developing custom applications on a common database platform in accordance with the preferred embodiment of the invention has the result that the database no longer has to maintain any identified in the preceding paragraph. Thus, a user no longer needs to maintain a dedicated database structure or application programming interface (API) for each document type captured using this method comprising a fundamental feature of the preferred embodiment of the invention. Using this technique a user can mix documents and custom user interfaces from hundreds of customers into the same data storage location.

Each user or group of users can have their own custom document templates defined that suit their needs. In varying embodiments of the invention, such document templates are defined on the smart phone, tablet or computing device using traditional user interface drag-and-drop definition methods, and these become the user interface for the application that all users see within that group of users. In the preferred embodiment of the invention, the document templates are defined on a smart phone or tablet running either the Android or iOS operating system. In an embodiment of the invention, the user interface drag-and-drop methods takes place via an online administration portal accessible via a web browser. Document templates can be created, modified or deleted at any time on the devices without any changes made to the structure of the server or the database-existing documents can also have new elements added, modified or deleted at any time. From that point forward, each document instance created from that template will have a unique schema generated by the new user interface as users type values into their custom forms. Documents based on out-of-date schemas are updated on-demand whenever an old document is edited with a new template. Therefore new and existing schemas and data are all generated and updated on demand as end-users type.

Since document schemas for each document are highly structured data, but each row in the database is a separate schema, the inventor recognizes that it is possible to have documents that contain other sub-documents. Thus, an embodiment of the invention provides for the creation of links between documents that form an over-arching process that are all defined within the user interface without the need for any server or database coding.

An example application of the method comprised in this application is to create custom applications for businesses or applications with custom documentations that share a common database. Each business can have their own build-your-own-app environment where they configure their own processes and documentation, and they can change and upgrade their process at any time without losing any data.

Since the data is captured in a structured format on a document-by-document basis where each document has its own structure, this data can then can be analyzed using map-reduce techniques so that a temporary common schema for multiple document types that do not share a common schema can be inferred for the purpose of generating performing various forms of analysis on the data comprised in the documents. In a preferred embodiment of the invention, a primary form of data captured comprises geolocation data, such as data collected from the GPS receiver of a mobile device. This removes the need to have traditional database queries or data organized into standard columns to generate reports.

For example, if a user had 100 customers that have 10 types of custom documentation each, the user would effectively need to have 1,000 database tables to manage this data, and changes in documentation would result in numerous of changes to the database structure. Using the implementation described herein, a user can use the same server API, database and database table to store the data for many customers with documentation types that are changing all the time. The invention described herein, therefore, is a unique solution to a problem faced by developers of highly customizable applications.

Figure 3:
FIG. 3 illustrates example representation of configuration tools for user interface widgets.

An implementation of the system disclosed herein functions by defining the user interface on some form of computing device, table or smart phone. The user interface layout for the application's documentation or for the application itself is defined using standard drag-and-drop visual designer techniques to create a series of "widgets" or controls on the screen, and this configuration is performed within the application. The widgets are arranged into Documents or Forms in some cases, but can more generally be used throughout the application. For example, FIG. 3 illustrates a representation of configuration tools 300 for user interface widgets.

These controls and their layouts can also be defined using a text editor if required however the method of creating the template is not relevant to the method of operation of the implementation. Example types of widgets or user interface controls that can be defined include those seen in most UI design software freely available on the Internet:
Single Line Text
  Text Areas
  Labels
  Signatures
  Grids
  Spreadsheets
  Photo Collections
  Date Controls
  Switches
  Photo Editing For each element on the user interface being defined, a unique identifier is assigned to each element that will act as the "binding" for that element. This binding value, which comprises text, is what uniquely identifies this widget/user-control on the user interface. This use of the word binding in this context differs and is distinct from the industry standard definition of the word binding. This different use of the word binding is what makes this implementation unique.

Figure 4:
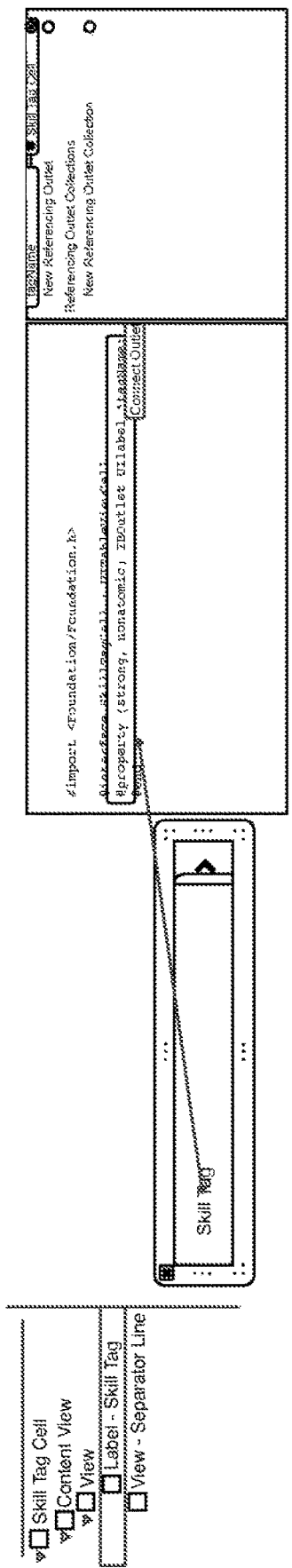
FIG. 4 illustrates an example user interface designer where a user interface element is "bound" to a property defined in code.

In a traditional software system with an interface designer, the binding (or "outlet") value is used to link the user interface element shown in the interface designer to programming code that the developer has written in a coding tool. For example, in Objective-C using Apple's XCode tool, we see the following binding of a user interface element to a property in code. For example, FIG. 4 illustrates a user interface designer 400 where a user interface element is "bound" to a property defined in code.

In C# from Microsoft, in both their WPF and Silverlight technologies, we see the following code: <label value="{binding path=propertyName target=self}"/>

In these cases, the user interface designers are associating user interface graphics/controls/widgets with code properties. By changing the value of the property that is bound to the control in code, one will end up with a corresponding change in the value displayed on the user interface at run-time. Most user interface designers then have Object Relational Mapping (aRM) tools available to turn this code into databases with tables and structures which map 1:1 to these C/C #/Java files that have been coded to represent the user interface. These techniques are described in great detail by Martin Fowler in his various publications, and are typically known as the model-view-controller (MVC), model-view-presenter (MVP) and model-view-view model (MVVM) patterns for user interface handling. There are many other techniques described as well.

Figure 5:
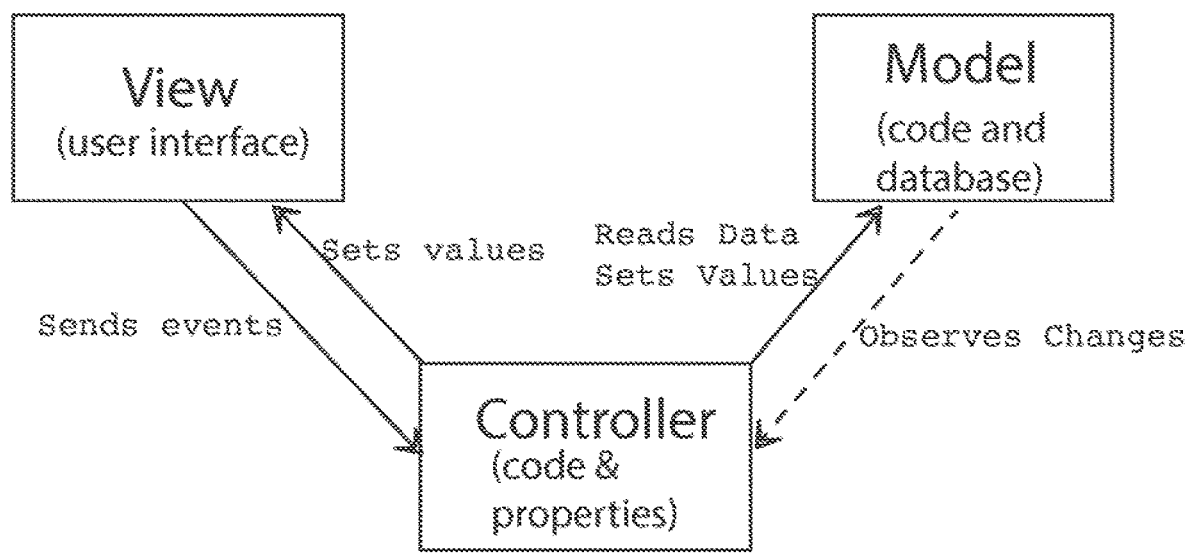
FIG. 5 illustrates an example of a very basic description of how a typical MVC system behaves. The user interface sends user events to a Controller piece of code that in turn tells the View what to display. Here the user widgets on the user interface are "bound" to properties in the controller, where the properties are the controls themselves, and the controller then manipulates the user controls' properties directly in code. The Controller also manipulates the Model to change values in the database. Some platforms allow the Controller code to observe database and model changes and react to them. Binding values are a direct reference to user interface code from a visual designer, and the widgets are directly manipulated in code.

For example, FIG. 5 illustrates a very basic description of how a typical MVC system 500 behaves. The user interface sends user events to a Controller piece of code that in turn turn tells the View what to display. Here the user widgets on the user interface are "bound" to properties in the controller, where the properties are the controls themselves, and the controller then manipulates the user controls' properties directly in code. The Controller also manipulates the Model to change values in the database. Some platforms allow the Controller code to observe database and model changes and react to them. Binding values are a direct reference to user interface code from a visual designer, and the widgets are directly manipulated in code.

Figure 6:
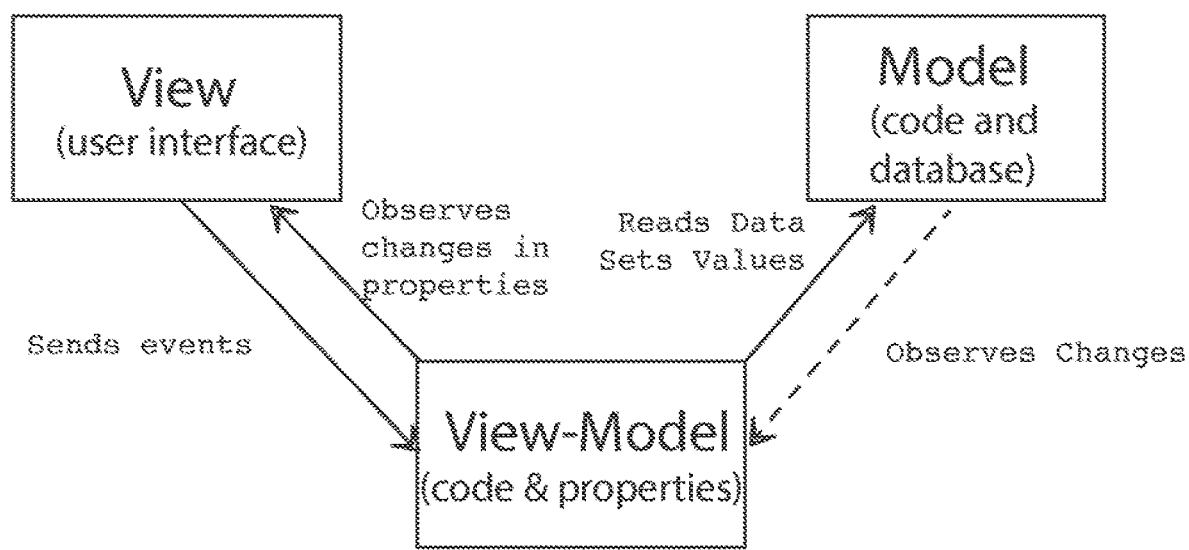
FIG. 6 illustrates an example of a very basic description of the newer Model-View-ViewModel (MVVM) design method. Here the "view model" is a code-based representation of the VALUES displayed on the screen, but it has no reference to the widgets, which are completely defined within the View. The user interface simply "observes" changes to the values on the view model objects and tells itself how to react to the values changing. This is distinct from MVC where the programmer tells the widgets what to do. Binding values tell the view which property on the view model it should get its data from the previous figure, since the sample doesn't fit on a single screen and needs to scroll.

On the other hand, FIG. 6 illustrates an example of a very basic description of the newer Model-View-ViewModel (MVVM) design method 600. Here the "view model" is a code-based representation of the VALUES displayed on the screen, but it has no reference to the widgets, which are completely defined within the View. The user interface simply "observes" changes to the values on the view model objects and tells itself how to react to the values changing. This is distinct from MVC where the programmer tells the widgets what to do. Binding values tell the view which property on the view model it should get its data from.

In all these cases, the database that stores the data or web services that provide the data have a set structure that is determined either by creating tables and columns in databases, or standard documents in a document database, and code is created to manage the interaction with the database. This code is either generated by programmers, or by automated tools like ORM tools.

In one implementation of the invention, the "binding" value as defined in the implementation is not used to bind the user interface widget to an code, or to bind the user interface to a data property on an object, defined in a programming language like the above examples, or to any database column that exists in a database.

Instead, the binding value, which is plain text, is used directly to name properties in a data structure that is generated on the fly to directly match the document template as it exists at implementation, however plain text JSON documents are ideal for this purpose (see www.json.org for the definition of the JSON format). The element-level bindings therefore define the user interface as well as define the schema for the data structures used to store data for that user interface. They are not used to perform any form of code property binding (MVVM) or code control binding (MVC).

In this way, element-level bindings for each element (i.e. widget) in a document act like column definitions for a database that doesn't exist yet. The present inventor has recognized that when the data structure is generated for this document, it is as if the columns in the database were created to apply only to this single instance of the document generated from this user interface at a particular point in time. With this method, it should be treated as if each time a document is created, each new instance has a brand new set of columns created for it. Bindings may or may not have the same binding names as bindings in other documents of the same type (since document templates can be changed at any time).

Each document/user interface definition also has a document-level binding which is just a plain text string also, which acts like a table name in a relational database that gives a "type" to each data structure being written. The result of this is that where two documents are defined and both have a binding name of "NOTES" defined for an element, if the documents had the same document level binding then "NOTES" would be treated as the same column in the same table if this were a relational database, however if both documents had document-level bindings of "SITE REPORT" and "TRUCK LOG" then the "NOTES" column would be like two different columns in two different tables. Note that in one implementation, the system does not create a tables or columns to make this work.

Figure 7:
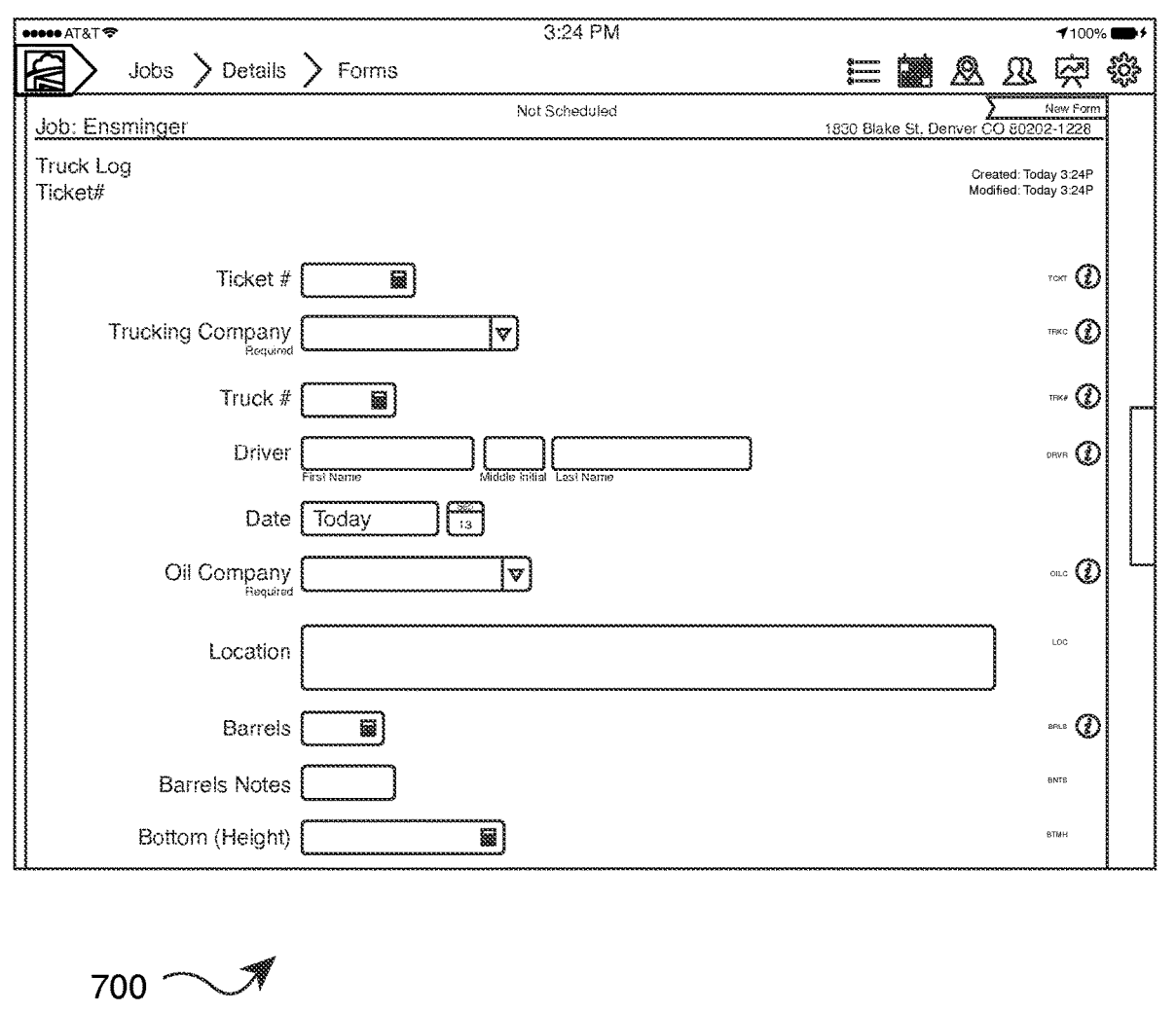
Figure 8:
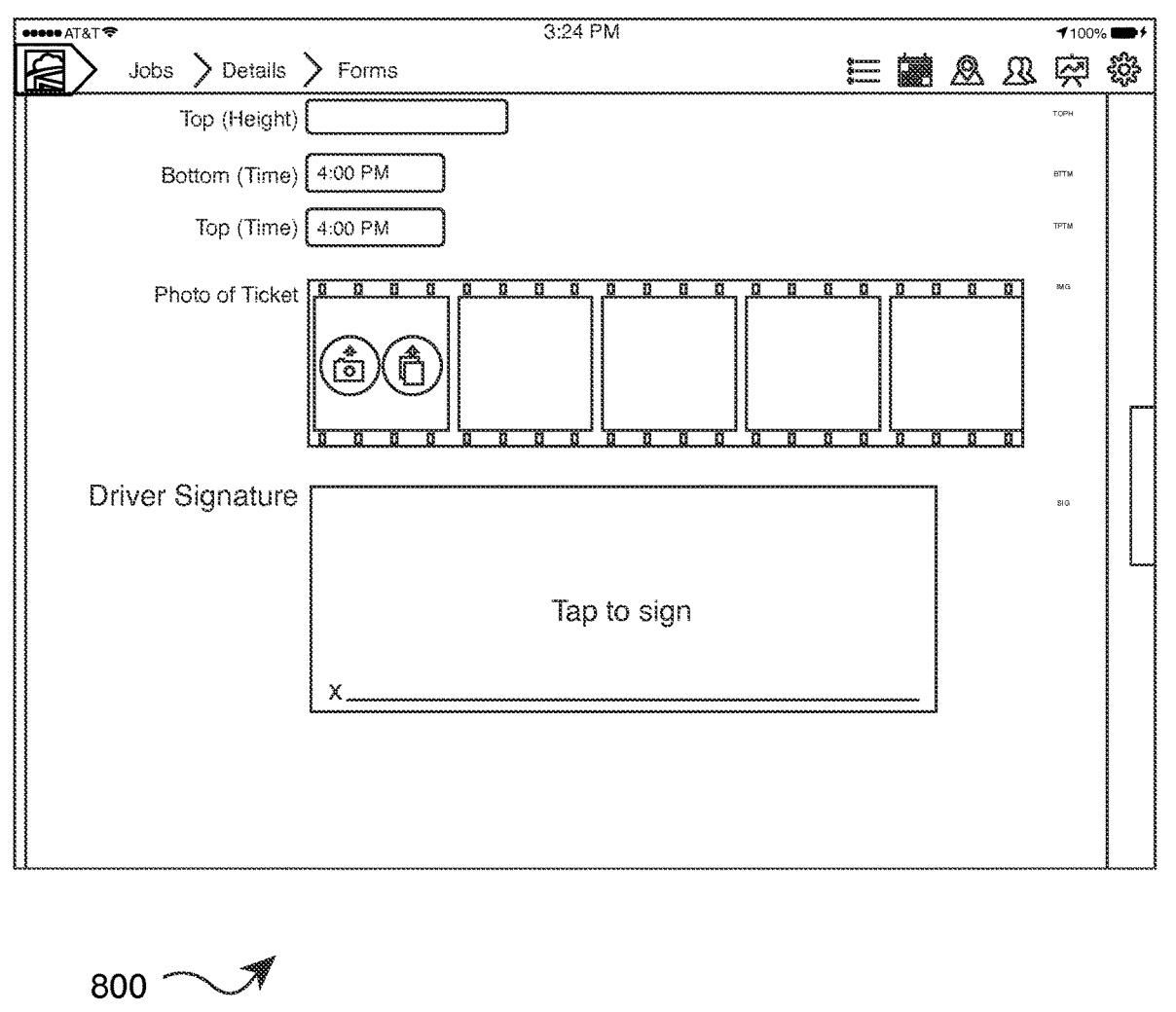

For example, a typical document may be described using the following user interface. FIG. 7 illustrates an example display 700 of a document generated at runtime from a template. Similarly, FIG. 8 illustrates an example second part of the document 800 defined by a template in the previous figure, since the sample doesn't fit on a single screen and needs to scroll.

The metadata associated with the document displayed in the previous figures contains configuration like the following to define the structure of the document, the controls displayed, and what bindings to use for each one element in the document, as well as what binding to use for the document as a whole:

---

Document Title: "Truck Log", Document Binding: "{TRUCK LOG}", Elements:
[
{ Title: "Ticket #", Binding: "{TICKET}", Control: "SmartText"
},
{ Title: "Trucking Company", Binding: "{TRUCKING COMPANY}", Control: "List"
},
{ Title: "Truck #", Binding: "{TRUCK NUMBER}", ControlType: "SmartText"
},
{ Title: "Driver", Binding: "{DRIVER}", Control: "PersonName"
},
{ Title: "Date", Binding: "{DATE} " , Control: "Date"
},
{ Title: "Oil Company", Binding: "{OIL COMPANY}", Control: "List"
},
{ Title: "Location", Binding: "{LOCATION}", Control: "Address"
},
{ Title: "Barrels", Binding: "{BARRELS}", Control: "SmartText"
},
{ Title: "Barrels Notes", Binding: "{BARRELS NOTES}", Control: "SmartText"
},
{ Title: "Bottom (Height)", Binding: "{BOTTOM HEIGHT}", Control: "SmartText"
},
{ Title: "Top (Height)", Binding: "{TOP HEIGHT}", Control: "SmartText"
},
{ Title: "Bottom (Time)", Binding: "{BOTTOM TIME}", Control: "Date"
},
{ Title: "Top (Time)", Binding: "{TOP TIME}", Control: "Date",
},
{ Title: "Photo of Ticket", Binding: "{ IMAGE} " , Control: "PhotoCollection",
},
{ "Title": "Driver Signature", "Control": "Signature", "Binding": "{SIGNATURE}",
}] }

---

Where bindings are listed above, the binding is specified using form "{value}", with curly braces used to indicate a binding, where value can be either:
1. A simple binding for an element of the current document, for example TICKET NUMBER, or
2. A complex binding to an element in a related document, for example TIMESHEETS.USERID, which allows the element to populate data into properties that are owned by parent documents, related documents, or child documents.

The exact syntax for specifying bindings in configuration and how the bindings are named is not relevant to the invention.

Note that the above sample is not the complete definition of a user interface that would be used in a product. For instance, in an embodiment of the invention, the user interface is accessible via an online administration portal through a web browser. A typical definition used in a product would require considerably more information about how each control was to be formatted and presented on the user interface—this is very similar to how a View in MVVM developments needs to be fully self-contained and self-describing of how to present the user interface controls to the end user. This extra visual formatting is not part of the patent claim. An implementation uses the bindings in the View directly as a database schema that's generated only when the view is used and which is unique to the user interface at the time the document is populated with data.

Figure 9:
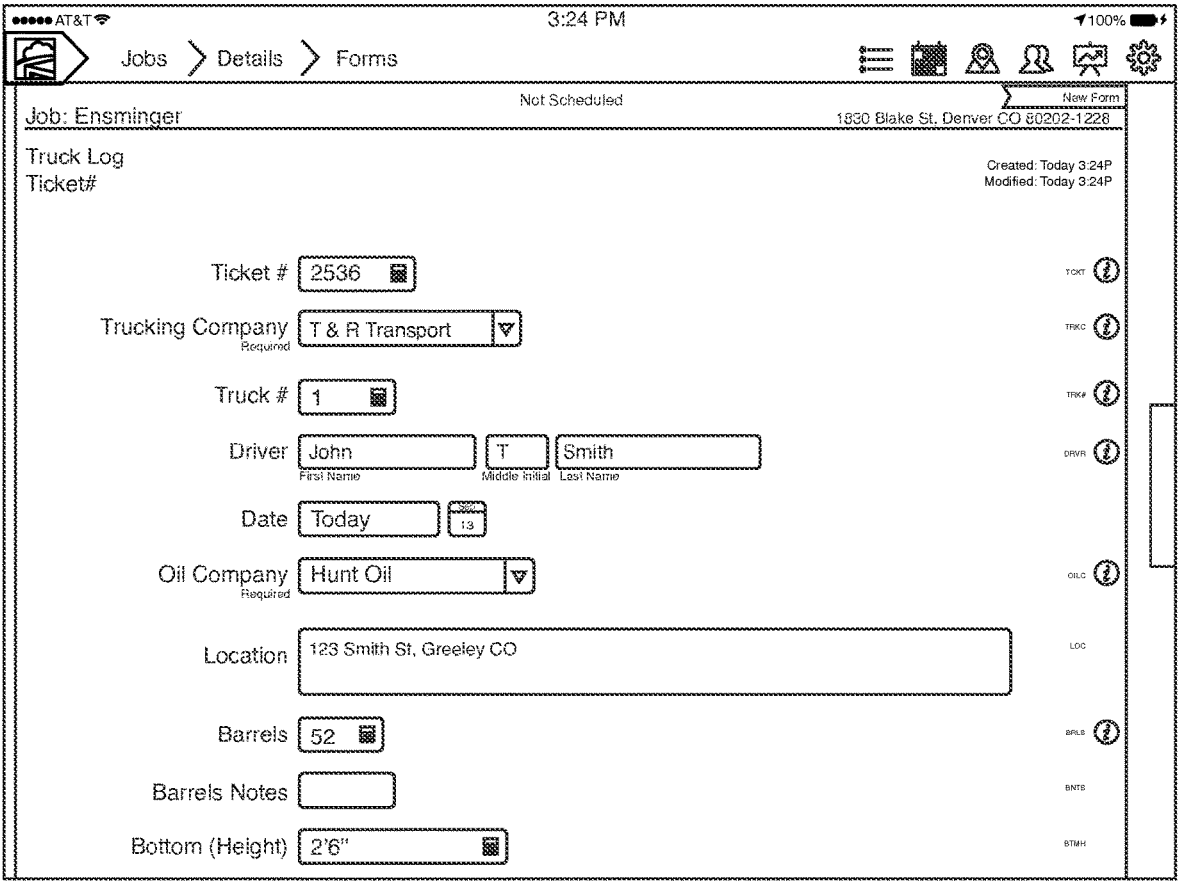
FIG. 9 illustrates an example of a dynamically generated user interface from the sample code above, now populated with data.
Figure 10:
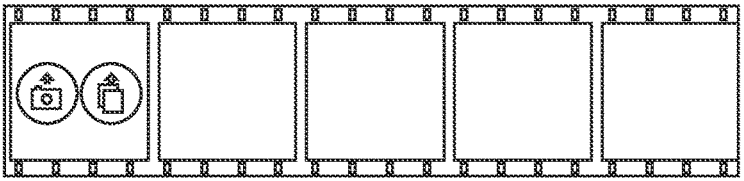
FIG. 10 illustrates an example of more details from the same document, showing the remaining controls being populated with data.

Using the above sample definition for the document template and bindings, the form can be filled out within the sample application using a variety of data capture and user interactivity techniques that are industry standard. For example, FIG. 9 illustrates a dynamically generated user interface from the sample code above, now populated with data 900. On the other hand FIG. 10 illustrates an example of more details from the same document, showing the remaining controls being populated with data 1000.

The system then assigns the values from each user interface element on the screen to a corresponding element in the data structure that has the same name as the binding defined in the configuration, with the following result:

---

Data: {
  TICKET: "2536",
  TRUCKING CO: "T & R Transport",
  TRUCK NUMBER: "1",
  DRIVER: {
    "FirstName":"John",
    "MiddleInitial":"T",
    "LastName":"Smith"
  },
  DATE: "2013-09-13",
  OIL COMPANY: "Hunt Oil",
  LOCATION: {
    STREET ADDRESS: "123 SMITH ST",
    CITY: "GREELY",
    STATE: "CO"},
  BARRELS: 52,
  BOTTOM HEIGHT: "2' 6''",
  TOP HEIGHT: "9' 5''",
  BOTTOM TIME: "T22: 00: 00Z" ,
  TOP TIME: "T23: 00: 00Z" ,
  SIGNATURE: {"#image.QRkaF34-f234112+1kFR"}
}

---

As can be seen from the controls storing data in this document, some of the controls store more than only simple values. They also store complex values as sub-documents within the document. For example, LOCATION stores a sub-document to store address data, and DRIVER stores a person name sub-document with broken down name information. Note that while images and signatures can be stored as base 64 text encoding of the image data, they can also be stored as references to other documents like they are here. Documents referencing elements of other documents will be covered elsewhere.

Figure 11:
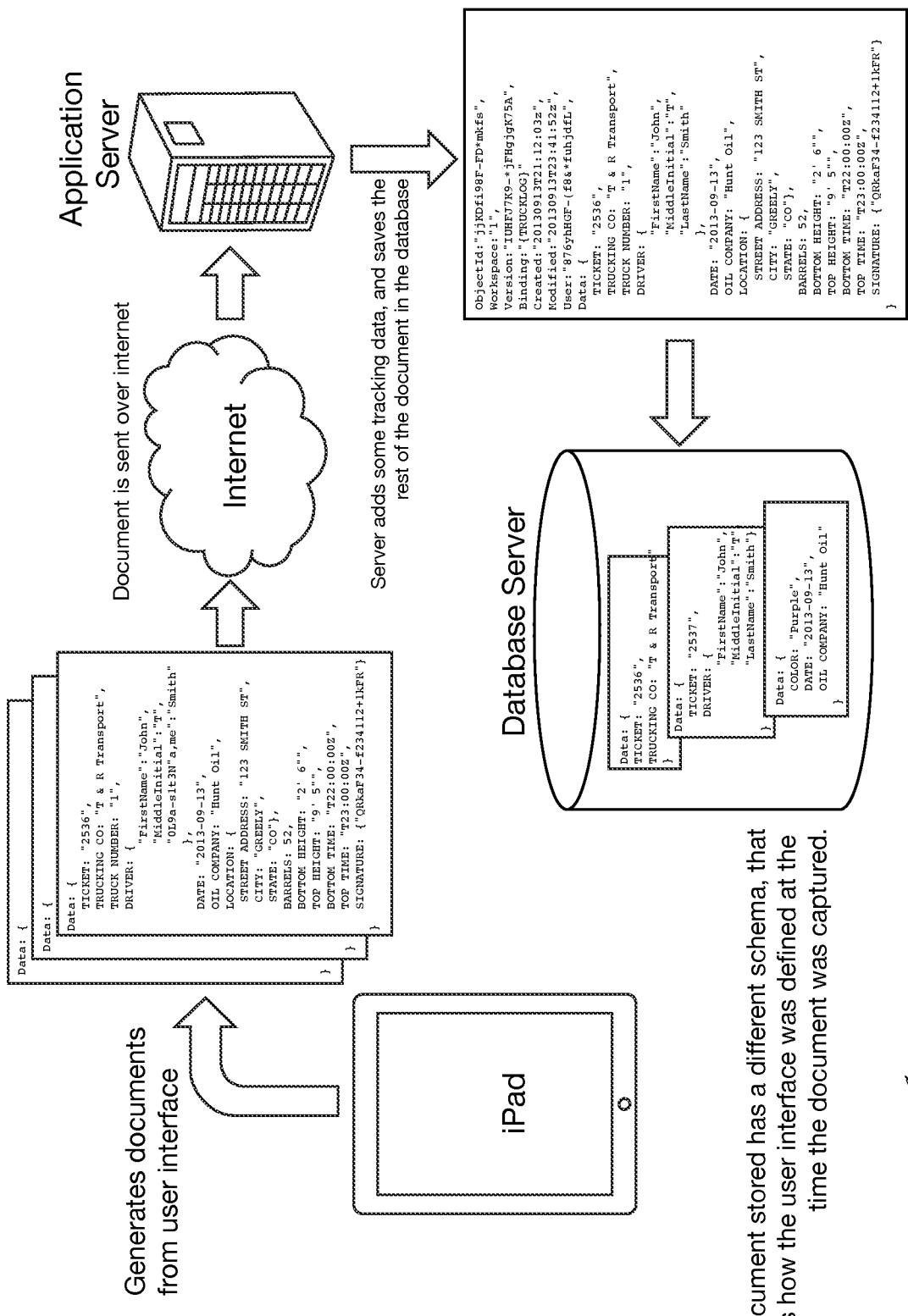
FIG. 11 illustrates an example diagram showing how the user interface values are sent as is via the application server to the database server without being changed.

This whole structure is then sent as-is to the server as plain text, and stored in a document database as plain text along with a small amount of additional metadata. For example, FIG. 11 illustrates a diagram 1100 showing how the user interface values are sent as is via the application server to the database server without being changed.

Techniques such as these do not lend themselves to use with traditional relational databases or column-centered database structures since each document stored has its own set of bindings and therefore would have a unique set of columns unique to that document at the time it was created.

This differs significantly from all existing build-your-own-application and other computer application development methods in that while the user interfaces generated are customized using standard techniques: Each document created from the user interface has its own unique database schema that:

a. is generated on demand as the document is populated with data;
b. is stored along with the each document as its sent to the server;
c. are documents with disparate schemas in the same database table
d. have no database table structures or API's that need to be generated or maintained for new document types, since each document is self-describing using the bindings defined in the document template at the time it was created.

The present invention incorporates a method of using the bindings defined in the user interface itself, in an embodiment via an online administration portal, to define the schema of each document being inserted into a database, where the database, servers, server application programming interfaces (APIs) and programming code have no schema of its own.

Editing Existing Documents

Document templates can change at any time without requiring any database schema changes. An existing version of a document can be created with template version 1, and then can later be edited with template version 2 which may add, remove or modify existing element definitions and bindings.

As a result, when a new template edits a document based on an older template, any bindings which match the new template will be upgraded on demand to the new format, any new bindings in the new template will be added to the data structure, and any old bindings in the old template that are not defined in the new template will be left as-is so that old data captured in older versions of the document templates is not lost.

In order to maintain a version history of each document submitted to the database where each document maintains its own schema, each new version of the document is compared to the previous version of the document, for both the schema and the values (since both schema and data values can change from instance to instance). The completed results are written to a standard key-value HISTORY table in a standard database format based on a differential performed against both schema and values.

Complex Values

This method therefore allows a user to store documents within documents in an embodiment of the invention. So, for example, a user can have a document that contains another complete set of sub-documents within it (example: a single master building inspection report with separate sub-documents for each room in the building), and a user can embed complex data structures inside each document, for example a full spreadsheet control:

Data: {
Title: "My Spreadsheet"
Materials Estimate: {
{ " 1 ", "3 / 4 EMT 8"", 5, "$ 3 . 5 0", "$ 1 7 . 5 0 " }, {"2", "4in Metal J-Box" , 8, "$2.15", "$17.20"}, {"Total","$34.70"} } }

The implementation of each custom control enables a user interpret the data stored in the document using programming code in C/C#/Java and other programming languages in the future. While the values stored here are complex/nested objects, the principle is the same in that the bindings in the user interface control the structure of documents of sub-documents as database schemas, and where complex types need to be stored against documents the underlying data structures just nest more sub-documents. This conversion happens in the user interface code.

Embodiments of the present invention foundationally avoid business logic of any kind being stored in associated databases. All business logic and value calculation is completed within the user interface. Alternatively, the information stored in the data structure, generated from the user interface binding definitions, is the pure value as displayed on the screen. How to format that for display is left up to the user interface to determine.

Document controls without values entered are not stored as part of the document as embodiments of the present invention are predicated on the assumption that no value is the same as empty value, For example the IMAGE and BARRELS NOTES bindings have no value entered on the form, so they have no entry in the data document.

The ultimate values stored in the system are always either strings (text), numbers or Boolean values (true/false, YES/NO). More complex data storage is always done by creating sub-documents within documents or sub-documents within sub-documents, where the structure to be written is always determined at run-time from the bindings defined in the template.

The preferred embodiment of the present invention comprises a View Model/Controller/Presenter and Model for this user interface definition automatically by using only information contained in the View (user interface) definition and without any coding being required, which is a novel approach to the problem of how to generate an application server and database architecture to support a desired user interface at runtime.

Sub-Documents

The present inventor has recognized that a document is just a collection of bindings with values, and some of the values can be complex types, so therefore it is possible to embed documents within documents easily. For example, a user can embed a list of InspectorSiteLog type documents inside a document of type, where the full contents of a document are embedded into a parent document. For example, FIG. 12 illustrates an example box diagram showing the concept of a document where one of the elements in the document embeds another sub-document 1200, or in this case, a list of sub-documents.

The user interface would generate the following data which is stored in the database as-is (the sub-documents are surrounded in a single line border to make them clear from the main part of the parent document):

Document Binding: "{SiteReport} ", Created: "201309IOT23:09:27z", ObjectId: "JfhjJF7638jJJJkf763+", VersionId: "AAbBbfj7678934j--HFkL", Workspace: "1"

-continued

```
Data: {
REMEDIATION#: "10798", SITE NAME: "Colorado Shale Assoc Site
B", SITE COMPLIANCE CODE: 3, INSPECTOR LOGS:
[ {
Document Binding: "{InspectorSiteLog}", ObjectId:
"KKKFkfjjd87Fm+kf-kfd",
Data: {
INSPECTOR NAME: "John Spencer", BADGE #: "8876", RESULT: 2,
COMPLIANCE: 3, RECOMMENDATION: "Repeat inspection in 1
week"
DATE COMPLETED: "20130913TI9:2I:3Iz"
}
},
{
Document Binding: "{InspectorSiteLog}" ObjectId:
"987JjhjjJJJfhjf786hu" Data:
{
INSPECTOR NAME: "John Spencer", BADGE #: "8876", RESULT: 5,
COMPLIANCE: 5, RECOMMENDATION: "Good improvements.
Re-inspect III 1
month." DATE COMPLETED: "20130923T23:59:09z"
}
}
] }
```

Figure 13:
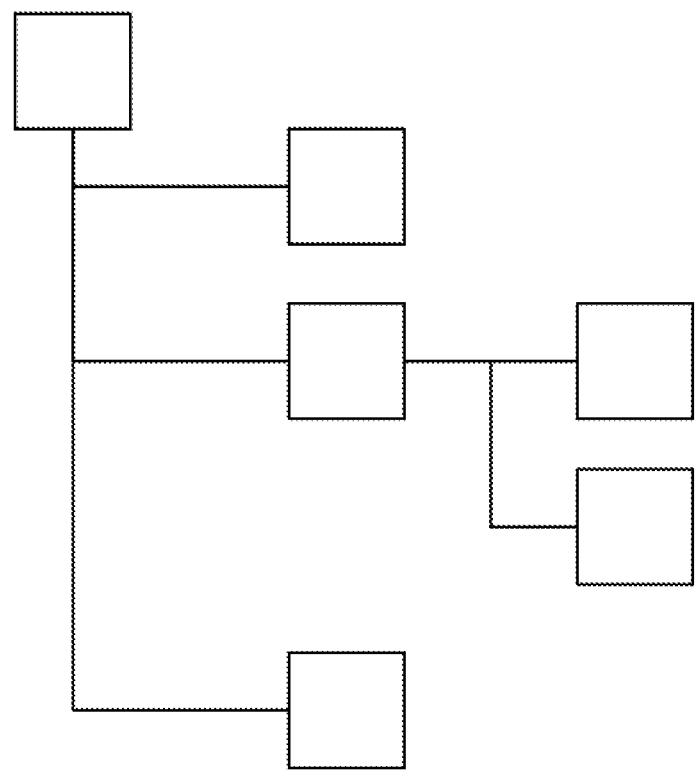
FIG. 13 illustrates an example block diagram indicating how documents can be contained within documents within documents. Each document contains its own data that may include links to sub-documents. Each sub-document does not need to maintain a link to its parent document.

Sub-documents have the capability to create sub-documents. Therefore the system can create a tree of nested documents automatically from the user interface definition of one or more documents. For example, FIG. 13 illustrates a block diagram 1300 indicating how documents can be contained within documents within documents. Each document contains its own data that may include links to sub-documents. Each sub-document does not need to maintain a link to its parent document.

The schema for a sub-document is automatically created from the user interface of the sub-document within a data element in the schema generated for parent document. As a result, the containment relationship from parent document to child document and from child document to parent document is automatically defined. The schema for the saved document in the database grows as the number of sub-documents added to the parent document is increased.

Documents Referencing Documents

One potential limitation of the document template defined schema described in this method is that each document created from a template which has own self-defined schema defined with the document, and therefore completely stands alone. This independence of the documents is what makes this user interface template driven approach with bindings possible.

In a preferred embodiment, an iPad it generates documents from a user interface. Contents of an example document are shown below.

```
Data: {
   TICKET: "2536",
   TRUCKING CO: "T & R Transport",
   TRUCK NUMBER: "1",
   DRIVER: {
      "FirstName": "John",
      "Middleinitial": "T",
      "0L9a-slt3N"a,me":"Smith"
   DATE: "2013-09-13",
   OIL COMPANY: "Hunt Oil",
   LOCATION: {
      STREET ADDRESS: "123 SMITH ST",
      CITY: "GREELY",
      STATE: "CO"},
   BARRELS: 52,
   BOTTOM HEIGHT: "2'6"",
   TOP HEIGHT: "9'5"",
   BOTTOM TIME: "T22:00:00Z",
   TOP TIME: "T23:00:00Z",
   SIGNATURE: {"QRkaF344234112+1kFR"}
}
```

The document is sent over the internet from the iPad to an application server. The application server adds tracking data and saves the rest of the document in a database of a database server. An example of the tracking data added to the document is shown below.

Object Id:"jjKDfi98F-FD*mkfs",
Workspace:"1",
Version:"IUHFJ7K9-*jFHgjgK75A",
Binding:"{TRUCKLOG}"
Created:"20130913T21:12:03z",
Modified:"20130913T23:41:52z",
User:"876yhHGF-(M*fuhjdfL", Each document stored has a different schema that matches have the user interface was to find at the time the document was captured.

This makes performing operations like foreign key joins between documents or aggregation/reporting operations, which are typical in relational databases, very difficult. There are three problems here: querying, reporting and linking unrelated documents.

Querying

Querying is handled neatly using some full-text search indexing techniques and standard map-reduce querying techniques made popular by Hadoop and other like large-scale big data databases. No claims are being made around querying to find documents in the database related to search criteria.

Map-Reduce and Aggregation

Aggregation and reporting is handled using map-reduce techniques which the set of schemas defining the documents we want to search are normalized to a temporary common format using their bindings as defined in the current document templates active at the time which defined the current active schema at that moment. This can be applied whether the document bindings defined in the template are common between documents of the same type—or completely different between document types. In fact, we can ignore the binding names for map-reduce purposes, and map the bindings with different names in different documents onto a common intermediate format, using the current document template definitions. This process is the "map" step of map-reduce algorithms, and relies also on the document bindings defined at runtime in the templates and document elements that match the current template. We are claiming that the ability to define the user interface bindings and then define mappings of these user interface elements onto the map step of a map-reduce algorithm is included in the invention.

The "reducing" part of the map-reduce process takes these intermediately transformed representations of the original documents.

Document Links and References

To link more than one document together, this method requires us to find a solution to the problems of linking:
A document to a document
A document to an element in another document
An element to another element in another document
An element in a document to a system defined object (like the current user account)

Since documents are stand-alone objects without a common schema from row to row, this involves defining "expressions" as part of the binding definitions for elements and documents that allow one document or document element to reference another.

NAME: "{#DEFAULTUSER.USERNAME}"
RELATED:
"{#DOC.SITELOG.ABBbfkdlfKSld76f80fik1}"

Alternatively, other syntax could be used to define this capability.

These relationships between elements and documents are part of the document binding definitions performed in the user interface though. They are used to build relationships between document schema elements that can only be read at runtime, where the elements may reside in the same document, in other documents of the same or different types, or in system-defined values. At no time are code, application programming interface (API) changes or database changes required to support these dynamic links between documents. Each document remains stand alone, but may optionally contains links to other elements that are outside the document data structure.

A claim being made is for the method of generating a set of document data from a user interface where each instance of the document's data created from the user interface has its own self-contained schema which is derived from the current version of the user interface element bindings defined when the document is used. This self-describing document is sent to a server and/or database back end for which no database schema has been defined and which can house rows where each row of data has an arbitrary structure. As such every "row" in the database has its own custom schema that can be inferred from the structure of the data in each row, and then combined using map-reduce techniques to perform reporting on a completely schemaless database. To redisplay the data back in the original forms, the document template element bindings and document bindings as defined at that point in time are used to interpret the schema defined in each document instance the user tries to redisplay. Using this method, build-your-own-application and custom documentation applications can be created easily by end users without requiring the user of programmers or database management. In an embodiment of the invention, the schemaless database and its files may be delivered by a user to a targeted group of other users by either delivering the file in a message, for instance as in an e-mail message or an SMS message, or by sending a hyperlink to a file. The targeted group of users is set by the user in the user interface, in the preferred embodiment of the invention, via an online administration portal. The preferred embodiment of the present invention demonstrates all the same features as a relational database with tables and columns and a custom coded application environment, but in a way that allows every document for every customer to be uniquely generated and stored in a single database for all users of the system. The preferred embodiment of the invention also provides features for build-your-own-application environments where end users can represent complex nested data structures over and above simple key-value pairs, which also makes this invention unique.

Figure 14:
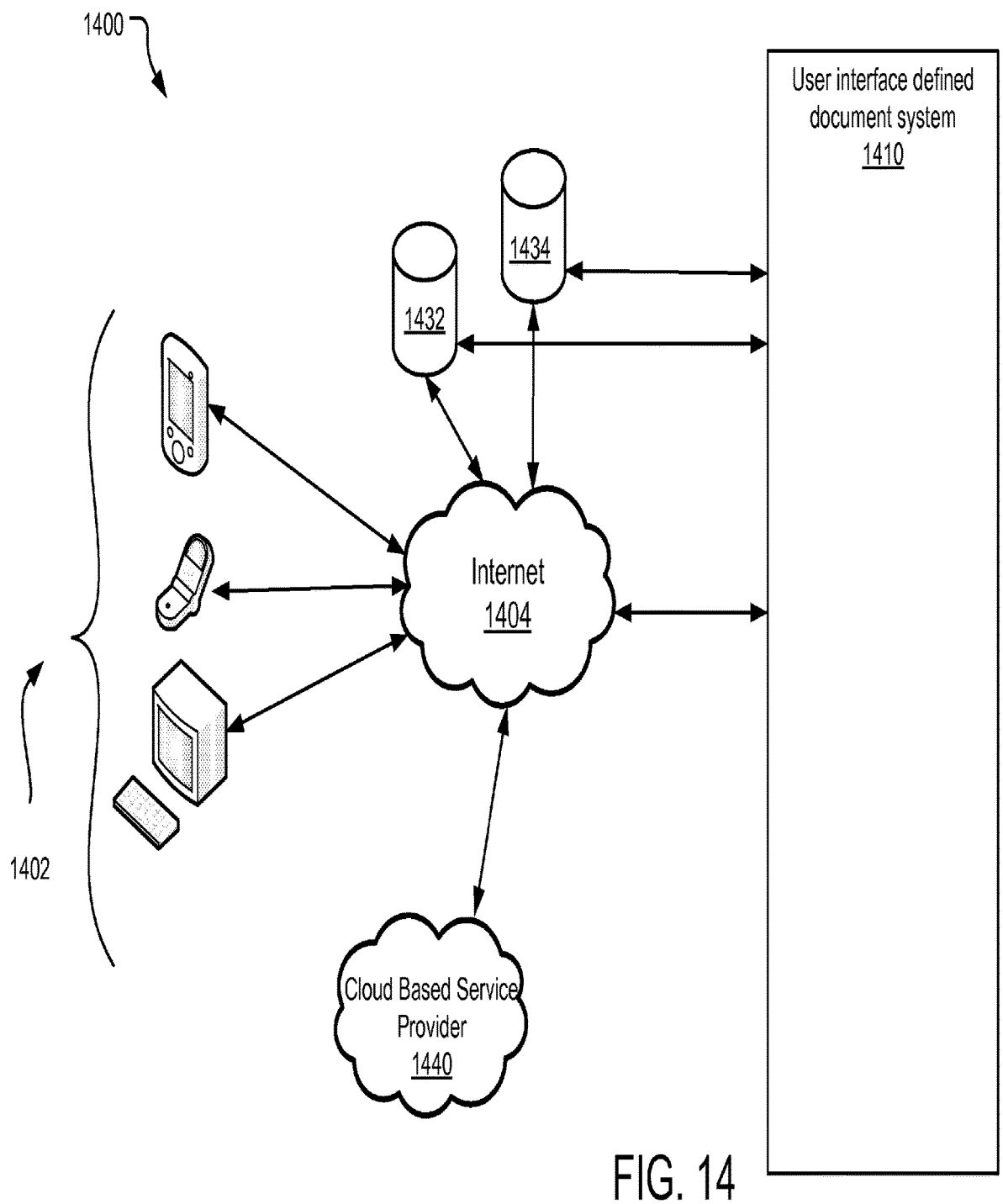
FIG. 14 illustrates an example block diagram representing a user interface defined document system.

FIG. 14 illustrates an example block diagram representing a user interface defined document system 1400.

Figure 15:
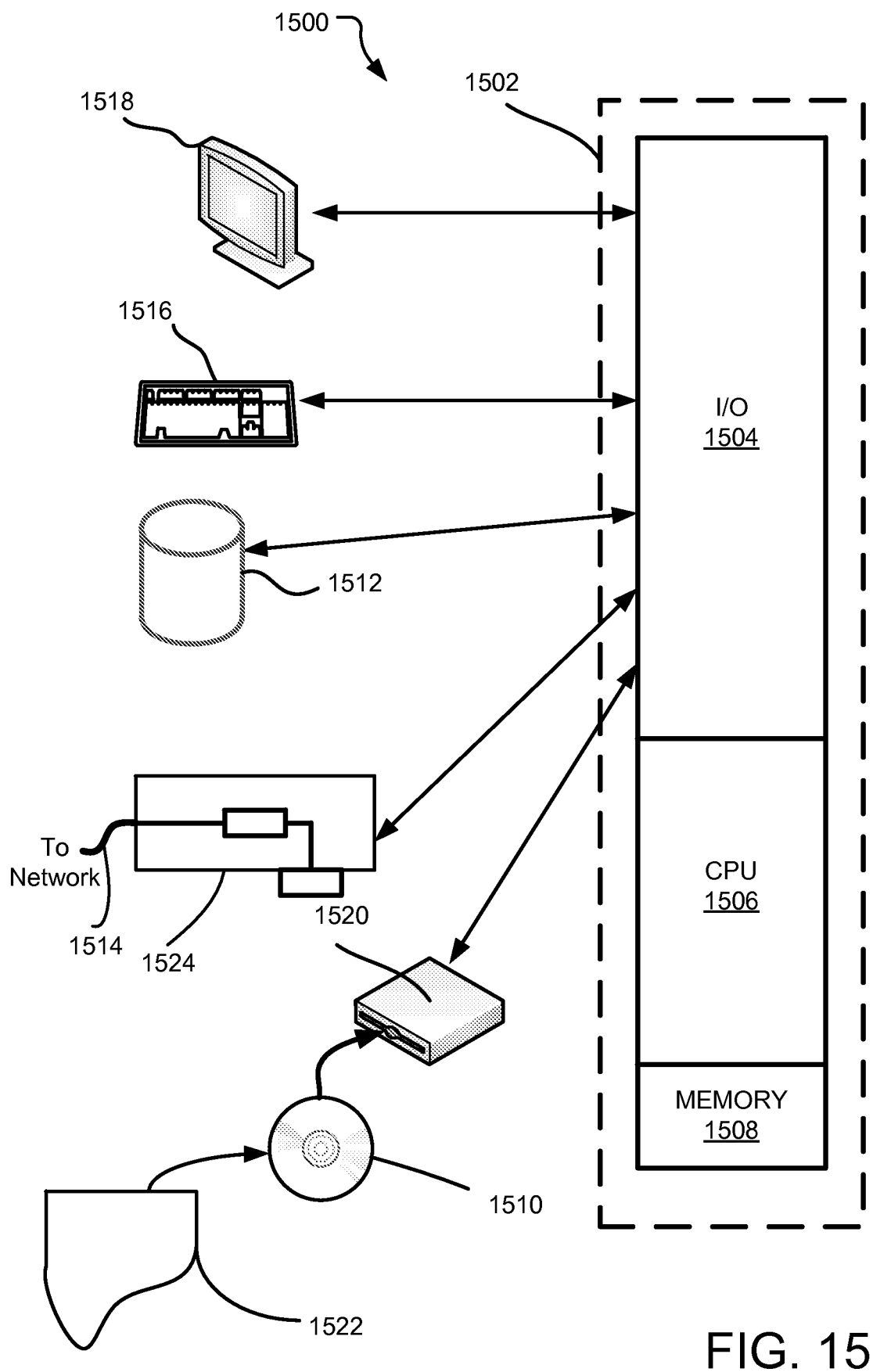
FIG. 15 illustrates an example computing system that can be used to implement the communication system disclosed herein.

FIG. 15 illustrates an example computing system that can be used to implement one or more components of the communication system method and system described herein. A general-purpose computer system 1500 is capable of executing a computer program product to execute a computer process. Data and program files may be input to the computer system 1500, which reads the files and executes the programs therein. Some of the elements of a general-purpose computer system 1500 are shown in FIG. 15, wherein a processor 1502 is shown having an input/output (I/O) section 1504, a Central Processing Unit (CPU) 1506, and a memory section 1508. There may be one or more processors 1502, such that the processor 1502 of the computer system 1500 comprises a single central-processing unit 1506, or a plurality of processing units, commonly referred to as a parallel processing environment. The computer system 1500 may be a conventional computer, a distributed computer, or any other type of computer such as one or more external computers made available via a cloud computing architecture. The described technology is optionally implemented in software devices loaded in memory 1508, stored on a configured DVD/CD-ROM 1510 or storage unit 1512, and/or communicated via a wired or wireless network link 1514 on a carrier signal, thereby transforming the computer system 1500 in FIG. 15 to a special purpose machine for implementing the described operations.

The I/O section 1504 is connected to one or more user-interface devices (e.g., a keyboard 1516 and a display unit 1518), a disk storage unit 1512, and a disk drive unit 1520. Generally, in contemporary systems, the disk drive unit 1520 is a DVD/CD-ROM drive unit capable of reading the DVD/CD-ROM medium 1510, which typically contains programs and data 1522. Computer program products containing mechanisms to effectuate the systems and methods in accordance with the described technology may reside in the memory section 1504, on a disk storage unit 1512, or on the DVD/CD-ROM medium 1510 of such a system 1500, or external storage devices made available via a cloud computing architecture with such computer program products including one or more database management products, web server products, application server products and/or other additional software components. Alternatively, a disk drive unit 1520 may be replaced or supplemented by a floppy drive unit, a tape drive unit, or other storage medium drive unit. The network adapter 1524 is capable of connecting the computer system to a network via the network link 1514, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, smart-phones, gaming consoles, set top boxes, tablets or slates (e.g., iPads), etc.

When used in a LAN-networking environment, the computer system 1500 is connected (by wired connection or wirelessly) to a local network through the network interface or adapter 1524, which is one type of communications device. When used in a WAN-networking environment, the computer system 1500 typically includes a modem, a network adapter, or any other type of communications device for establishing communications over the wide area network. In a networked environment, program modules depicted relative to the computer system 1500 or portions thereof, may be stored in a remote memory storage device. It is appreciated that the network connections shown are exemplary and other means of and communications devices for establishing a communications link between the computers may be used.

Further, the plurality of internal and external databases, data stores, source database, and/or data cache on the cloud server are stored as memory 1508 or other storage systems, such as disk storage unit 1512 or DVD/CD-ROM medium 1510 and/or other external storage device made available and accessed via a cloud computing architecture. Still further, some or all of the operations for the system for communication system disclosed herein may be performed by the processor 1502. In addition, one or more functionalities of the system disclosed herein may be generated by the processor 1502 and a user may interact with these GUIs using one or more user-interface devices (e.g., a keyboard 1516 and a display unit 1518) with some of the data in use directly coming from third party web sites and other online sources and data stores via methods including but not limited to web services calls and interfaces without explicit user input.

A server 1606 hosts the system for communication system. In an alternate implementation, the server 1606 also hosts a website or an application that users visit to access the system for communication system. Server 1606 may be one single server, or a plurality of servers with each such server being a physical server or a virtual machine or a collection of both physical servers and virtual machines. Alternatively, a cloud 1608 hosts one or more components of the system for communication system. The user devices 1604, the server 1606, the cloud 1608, as well as other resources connected to the communications network 1602 access one or more of servers 1610, 1612, and 1614 for getting access to one or more websites, applications, web service interfaces, etc., that are used in communication system. In one implementation, the server 1606 also hosts a search engine that is used by the system for accessing the system for communication system and to select one or more services used in communication system.

Figure 16:
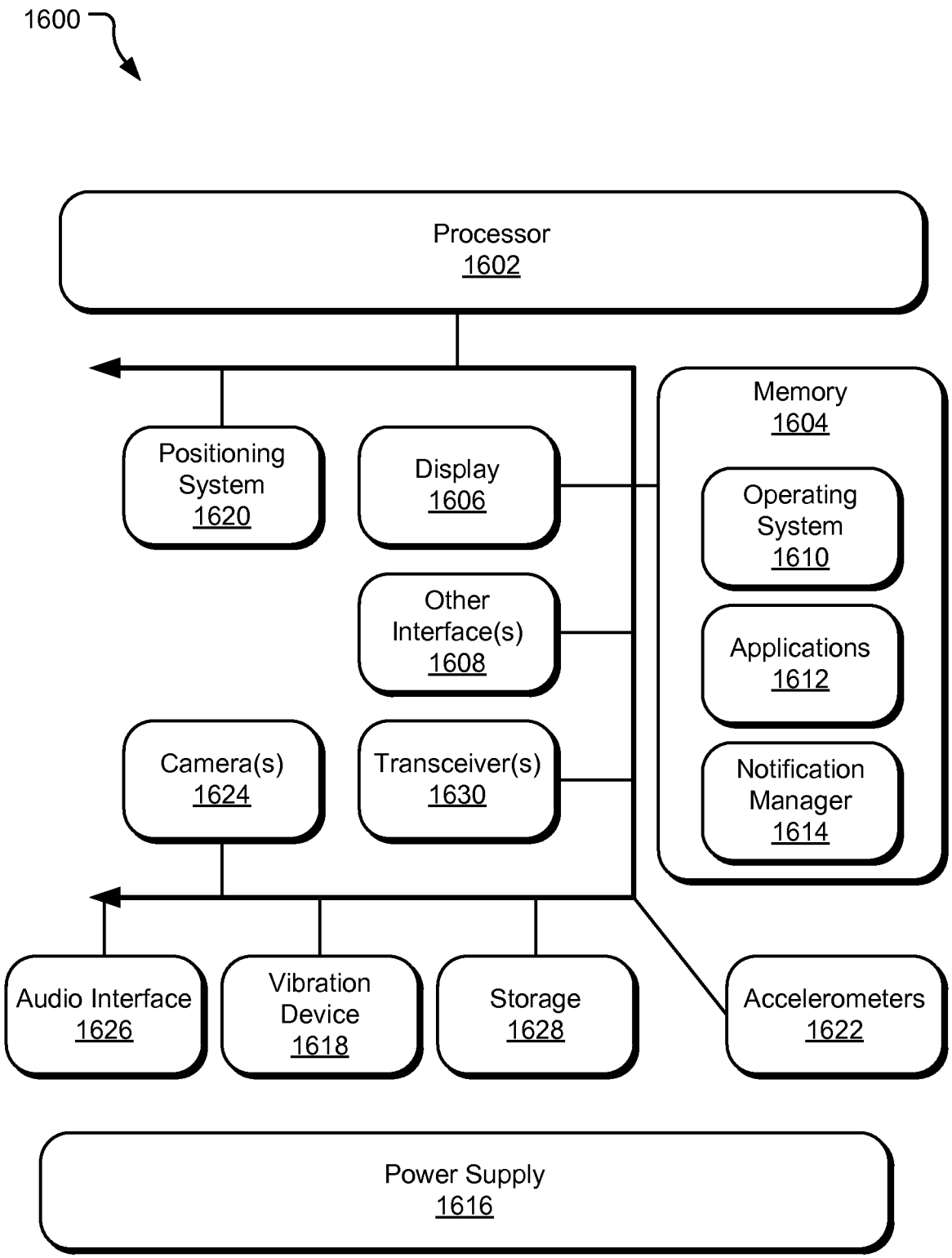
FIG. 16 illustrates an example mobile computing device that can be used to implement one or more components of the communication system disclosed herein.

FIG. 16 illustrates an example mobile computing device 1600 that can be used to implement one or more components of the communication system disclosed herein. Specifically, the mobile computing device 1600. The mobile device 1600 includes a processor 1602, a memory 1604, a display 1606 (e.g., a touchscreen display), and other interfaces 1608 (e.g., a keyboard). The memory 1604 generally includes both volatile memory (e.g., RAM) and non-volatile memory (e.g., flash memory). An operating system 1610, such as the Microsoft Windows® Phone 7 operating system, resides in the memory 1604 and is executed by the processor 1602, although it should be understood that other operating systems may be employed.

One or more application programs 1612 are loaded in the memory 1604 and executed on the operating system 1610 by the processor 1602. Examples of applications 1612 include without limitation email programs, scheduling programs, personal information managers, Internet browsing programs, multimedia player applications, etc. In one implementation, an communication system application stored in the memory 1604 may be used to catalog various observations stored on the mobile device 1600, such as e-mail addresses from the e-mail application of the mobile device, the contacts from a contact management application stored on the mobile device 1600, etc. In yet alternate implementation, a client application stored in the memory 1604 of the mobile device 1600 may generate queries using the information stored on the mobile device 1600, receive entity relation information from a server generating relations between various elements, and display updated observations to a user of the mobile device 1600. A notification manager 1614 is also loaded in the memory 1604 and is executed by the processor 1602 to present notifications to the user. For example, when a promotion is triggered and presented to the shopper, the notification manager 1614 can cause the mobile device 1600 to beep or vibrate (via the vibration device 1618) and display the promotion on the display 1606.

The mobile device 1600 includes a power supply 1616, which is powered by one or more batteries or other power sources and which provides power to other components of the mobile device 1600. The power supply 1616 may also be connected to an external power source that overrides or recharges the built-in batteries or other power sources.

The mobile device 1600 includes one or more communication transceivers 1630 to provide network connectivity (e.g., mobile phone network, Wi-Fi®, BlueTooth®, etc.). The mobile device 1600 also includes various other components, such as a positioning system 1620 (e.g., a global positioning satellite transceiver), one or more accelerometers 1622, one or more cameras 1624, an audio interface 1626 (e.g., a microphone, an audio amplifier and speaker and/or audio jack), and additional storage 1628. Other configurations may also be employed.

Embodiments of the present technology are disclosed herein in the context of a communication system. In the above description, for the purposes of explanation, numerous specific details are set forth in order to provide a thorough understanding of the present application. It will be apparent, however, to one skilled in the art that the present application may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the application, as other embodiments of the application may omit such features.

In the interest of clarity, not all of the routine functions of the implementations described herein are shown and described. It will, of course, be appreciated that in the development of any such actual implementation, numerous implementation-specific decisions may be made in order to achieve the developer's specific goals, such as compliance with application—and business-related constraints, and that those specific goals will vary from one implementation to another and from one developer to another.

According to one embodiment of the present application, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present application, the components, processes and/or data structures may be implemented using machine language, assembler, C or C++, Java and/or other high level language programs running on a data processing computer such as a personal computer, workstation computer, mainframe computer, or high performance server running an as such as Solaris® available from Sun Microsystems, Inc. of Santa Clara, California, Windows Vista™, Windows NT®, Windows XP PRO, and Windows® 2000, available from Microsoft Corporation of Redmond, Washington, Apple as X-based systems, available from Apple Inc. of Cupertino, California, or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present application, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the application. Although various embodiments of the application have been described above with a certain degree of particularity, or with reference to one or more individual embodiments, those skilled in the art could make numerous alterations to the disclosed embodiments without departing from the spirit or scope of this application. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the application as defined in the following claims.

I claim:

1. An apparatus for creating a database, resident on a server, having an unstructured set of rows, using a set of client devices, comprising:
   the server, in communication with the set of client devices, programmed to:
      generate, by a processor, a first document template that defines a first user interface and a second document template that defines a second user interface;
      receive a first document, from a first client device, of the set of client devices, generated from the first user interface including a first set of interface element bindings, unique to the first client device, and a first set of document level bindings;
      add, by the processor, first tracking data to the first document;
      generate, by the processor, a first flat file from the first document using the first set of interface element bindings and the first set of document level bindings;
      store, in a memory, the first document, with a first schema defined by the first set of interface element bindings, in a first row of the unstructured set of rows;
      receive a second document, from a second client device of the set of client devices, generated from the second user interface including a second set of interface element bindings, unique to the second client device, and a second set of document level bindings;
      add, by the processor, second tracking data to the second document;
      generate, by the processor, a second flat file from the second document using the second set of interface element bindings and the second set of document level bindings;
      store, in the memory, the second document, with a second schema defined by the second set of interface element bindings, in a second row of the unstructured set of rows;
      retrieve the first document, by reference to the first set of interface element bindings, a temporary common format and the first set of document level bindings; and;
      retrieve the second document, by reference to the second set of interface element bindings, the temporary common format and the second set of document level bindings.

2. The apparatus for creating the database of claim 1, wherein the server is programmed to:
   map the first set of interface element bindings and the second set of interface element bindings to the temporary common format.

3. The apparatus for creating the database of claim 2, wherein the server is programmed to:
   report the first set of interface element bindings and the second set of interface element bindings by using the temporary common format.

4. The apparatus for creating the database of claim 3, wherein the first client device of the set of client devices is programmed to:
   define the first document template that defines the first user interface by dragging and dropping a set of user interface widgets.

5. The apparatus for creating the database of claim 4, wherein the first client device of the set of client devices is programmed to:
   embed a sub-document within the first document.

6. The apparatus for creating the database of claim 5, wherein the first client device of the set of client devices is programmed to:
define the first set of interface element bindings to include a date field, a string field, and an image field.

7. The apparatus for creating the database of claim 6, wherein the first client device of the set of client devices is programmed to:
assign a set of values to each of the date field, the string field, and the image field.

\* \* \* \* \*